United States Patent
Wusatowska-Sarnek

(10) Patent No.: US 11,795,295 B2
(45) Date of Patent: Oct. 24, 2023

(54) WEAR RESISTANT COATING, METHOD OF MANUFACTURE THEREOF AND ARTICLES COMPRISING THE SAME

(71) Applicant: RTX Corporation, Farmington, CT (US)

(72) Inventor: Agnieszka M. Wusatowska-Sarnek, Mansfield Ctr., CT (US)

(73) Assignee: RTX CORPORATION, Farmington, CT (US)

( * ) Notice: Subject to any disclaimer, the term of this patent is extended or adjusted under 35 U.S.C. 154(b) by 532 days.

(21) Appl. No.: 15/804,430

(22) Filed: Nov. 6, 2017

(65) Prior Publication Data

US 2019/0136701 A1 May 9, 2019

(51) Int. Cl.
| | |
|---|---|
| C08K 3/28 | (2006.01) |
| F01D 5/28 | (2006.01) |
| F01D 11/12 | (2006.01) |
| B32B 9/00 | (2006.01) |

(52) U.S. Cl.
CPC ............... *C08K 3/28* (2013.01); *F01D 5/288* (2013.01); *B32B 9/005* (2013.01); *C08K 2003/282* (2013.01); *F01D 11/122* (2013.01); *F05D 2240/307* (2013.01); *F05D 2300/174* (2013.01); *F05D 2300/2282* (2013.01); *F05D 2300/609* (2013.01); *F05D 2300/6032* (2013.01); *F05D 2300/611* (2013.01); *Y10T 428/25* (2015.01)

(58) Field of Classification Search
CPC .......... C25D 3/12; C25D 15/00; C25D 3/025; F01D 5/288; F01D 5/147; F01D 5/286; F01D 11/122; F05D 2300/609; F05D 2230/313; F05D 2230/314; F05D 2300/6032; F05D 2300/2282; F05D 2240/307; F05D 2230/90; F05D 2300/174; F05D 2300/611
See application file for complete search history.

(56) References Cited

U.S. PATENT DOCUMENTS

| | | | |
|---|---|---|---|
| 4,689,242 A | 8/1987 | Pike | |
| 5,127,924 A | 7/1992 | Russell | |
| 5,139,537 A | 8/1992 | Julien | |
| 5,683,825 A * | 11/1997 | Bruce | C23C 28/00 427/248.1 |
| 5,952,110 A * | 9/1999 | Schell | F01D 11/12 205/109 |
| 5,997,248 A | 12/1999 | Ghasripoor et al. | |
| 9,341,066 B2 | 5/2016 | Bintz et al. | |
| 9,581,042 B2 | 2/2017 | Strock | |
| 10,415,400 B2 * | 9/2019 | Uihlein | F01D 5/147 |
| 2013/0333392 A1 | 12/2013 | Bintz et al. | |
| 2016/0169013 A1 * | 6/2016 | Guo | B23H 1/10 415/200 |
| 2016/0237832 A1 | 8/2016 | Strock | |
| 2017/0009591 A1 | 1/2017 | Flores Renteria et al. | |

FOREIGN PATENT DOCUMENTS

| | | |
|---|---|---|
| EP | 3029113 A1 | 6/2016 |
| EP | 3239465 A1 | 11/2017 |
| WO | 2017080645 A1 | 5/2017 |

OTHER PUBLICATIONS

European Search Report for Application No. 18204084.0; dated Apr. 15, 2019, 7 pages.
Bhaduri et al.; "Effect of pulsed DC CFUBM sputtered TiN coating on performance of nickel electroplated monolayer-cBN wheel in grinding steel"; Surface & Coatings Technology; 204; 2010, pp. 3818-3832.
Bhaduri et al.; "On tribological behaviour and application of TiN and MoS2—Ti composite coating for enhancing performance of monolayer cBN grinding wheel"; Wear; 268; 2010, pp. 1053-1065.
Bhaduri et al.; "Study on the role of PVD TiN coating in improving the performance of electroplated monolayer superabrasive wheel"; Surface & Coatings Technology; 205; 2010, pp. 658-667.
Wenfeng et al.; "Review on monolayer CBN superabrasive wheels for grinding metallic materials"; Chinese Journal of Aeronautics; 30(1); 2017, pp. 109-134.

* cited by examiner

*Primary Examiner* — Cheng Yuan Huang
(74) *Attorney, Agent, or Firm* — CANTOR COLBURN LLP

(57) ABSTRACT

Disclosed herein is an article comprising a substrate; an abrasive coating disposed on the substrate; where the abrasive coating comprises a matrix having abrasive grit particles dispersed therein; and a layer of material disposed on the abrasive coating; where the layer of material is a titanium nitride (TiN), boron nitride (BN), titanium-aluminum-nitrides [(TiAl)N], titanium-aluminum-silicon-nitrides [(TiAlSi)N], chromium nitrides (CrN), aluminum oxide ($Al_2O_3$), titanium oxide ($TiO_2$), silicon carbo-nitride (SiCN), titanium carbo-nitride (TiCN), or a combination thereof.

6 Claims, 6 Drawing Sheets

WEAR RESISTANT COATING, METHOD OF MANUFACTURE THEREOF AND ARTICLES COMPRISING THE SAME

BACKGROUND

The present disclosure is directed to a wear resistant coating, a method of manufacture thereof and to articles comprising the same. In particular, the present disclosure relates to a wear resistant coating for turbomachinery and, more particularly, to turbomachine components having abrasive coatings.

Turbomachinery, such as gas turbine engines, have rotors with one or more rows of rotating blades. Radially outward tips of the blades are located in close proximity to a stationary surface which is, or acts as, a seal. To maximize engine efficiency, leakage of gas or other working fluid around the blade tips should be minimized. This may be achieved by configuring the blade tips and seal such that they contact each other during periods of operation of the turbomachine, such as during initial operation of the turbomachine referred to as the green run, during normal operation, and possibly during other operating conditions such as a bird strike. With such a configuration, the blade tips act as an abrading component and the seal can be provided as an abradable seal. Generally, the blade tip is harder and more abrasive than the seal. Thus, the blade tips will abrade or cut into the abradable seal during those portions of the engine operating cycle when the blade tip comes into contact with the abradable seal. This interaction between blade tips and seal is desirable as it helps to provide minimal leakage between blade tips and seal.

Since gas turbine engines, such as aircraft gas turbine engines, experience cyclic mechanical and thermal load variations during operation, their geometry varies during different stages of the operating cycle. Thus, the blade tips should retain their cutting capability over many operating cycles compensating for any progressive changes in gas turbine engine geometry.

During certain engine operating conditions, such as during a bird strike or engine surge, gas turbine engines have shown high radial interaction rates between the blade tips and abradable seals (~40"/s) that can cause rapid depletion of the abrasive blade tip coating when rubbed against the abradable seals. Low radial interaction rates, which occur during certain engine operating conditions such as during low transient thermal or mechanical loading cycles (for example during the green run), can also result in excessive wear and damage to abradable seals through the generation of large thermal excursions within the seal system (abrasive tip and abradable seal).

If the abrasive coating on the blade tip is depleted, unwanted sliding contact or rubbing of the base material of the blade tip, such as titanium, nickel, steel and aluminum alloys may occur. In addition, unwanted abrasion of the abradable seal may also occur. This results in direct contact between the base material of the blade tip and the abradable seal. Contact of base material with the abradable seal can cause unwanted conditions within the gas turbine engine. In addition, blade tip depletion increases the leakage of gas which reduces engine efficiency.

It is therefore desirable to have a blade tip that provides the blade with enhanced wear and abrasion resistance to minimize the occurrence of undesirable conditions in the gas turbine engine.

SUMMARY

In accordance with the present disclosure, there is provided an article comprising a substrate; an abrasive coating disposed on the substrate; where the abrasive coating comprises a matrix having abrasive grit particles dispersed therein; and a layer of material disposed on the abrasive coating; where the layer of material is a titanium nitride (TiN), boron nitride (BN), titanium-aluminum-nitrides [(TiAl)N], titanium-aluminum-silicon-nitrides [(TiAlSi)N], chromium nitrides (CrN), aluminum oxide ($Al_2O_3$), titanium oxide ($TiO_2$), silicon carbo-nitride (SiCN), titanium carbo-nitride (TiCN), or a combination thereof.

In an embodiment, the substrate comprises a tip of an airfoil.

In another embodiment, the abrasive is cubic boron nitride (CBN), coated silicon carbide (SiC), alumina, zirconia, or a combination thereof.

In yet another embodiment, the matrix is nickel, cobalt, or MCrAlY, where M represents nickel, cobalt, aluminum, titanium, copper, chrome, or a combination thereof.

In yet another embodiment, the abrasive is homogeneously dispersed and covers 15 to 60 percent of the blade tip surface area.

In yet another embodiment, the layer of material has a thickness of 0.1 to 50 micrometers measured from an interface between abrasive coating and the layer of material.

In yet another embodiment, the layer of material partially covers the abrasive coating.

In yet another embodiment, the layer of material covers an entire surface of the abrasive coating.

In yet another embodiment, the grit particles have an average particle size of 30 to 1000 micrometers.

Disclosed herein too is a method comprising disposing on a substrate a layer of an abrasive coating; where the abrasive coating comprises a matrix having abrasive grit particles dispersed therein; and disposing on the layer of abrasive coating a layer of material; where the layer of material is a titanium nitride (TiN), boron nitride (BN), titanium-aluminum-nitrides [(TiAl)N], titanium-aluminum-silicon-nitrides [(TiAlSi)N], chromium nitrides (CrN), aluminum oxide ($Al_2O_3$), titanium oxide ($TiO_2$), silicon carbo-nitride (SiCN), titanium carbo-nitride (TiCN), or a combination thereof.

In an embodiment, the disposing of the abrasive coating is accomplished by a method comprising electrolytic deposition.

In yet another embodiment, the disposing of the layer of material is conducted via physical vapor deposition, chemical vapor deposition, plasma enhanced vapor deposition, metal organic chemical vapor deposition, or a combination thereof.

In yet another embodiment, a precursor used in the physical vapor deposition comprises Ti, Al, Si, Cr or combination of thereof.

In yet another embodiment, the physical vapor deposition is conducted at a temperature of 650° C. or lower.

In yet another embodiment, the physical vapor deposition is conducted in a nitrogen atmosphere.

In yet another embodiment, the nitrogen atmosphere is comprises reactive nitrogen.

In yet another embodiment, the layer of material has a thickness of 0.1 to 50 micrometers measured from an interface between abrasive coating and the layer of material.

Other details of the wear resistant coating incorporating abrasive particles are set forth in the following detailed description and the accompanying drawing wherein like reference numerals depict like elements.

DETAILED DESCRIPTION

Disclosed herein is a tip for a turbine engine component that comprises a layer of material (i.e., a coating) disposed atop an abrasive coating that is itself disposed on the tip of the turbine component. The layer of material provides a hard coating that prevents grain pull-out from a bond between abrasive grains and the matrix in which they are embedded thereby enhancing abrasion resistance. In an embodiment, the layer of material improves the ultimate strength of the matrix material in which the grit is embedded. The layer of material comprises a nitride, an oxide, a carbo-nitride, or a combination comprising at least one of the foregoing materials. Details of the material are provided later in this text.

Engine operating conditions (in turbomachinery such as gas turbines), especially in the back end of a compressor, are characterized by high temperatures that can reach up to 815° C. and accompanied with an aqueous and sulfurous atmosphere. During the blade tip and sealing interaction, the temperature at the tip can exceed 1093° C. These conditions lead to degeneration of the abrasive coating with time, such as oxidation of particles or softening of the matrix in which they are embedded leading to a grit pullout from the matrix. In addition, during a bird strike or engine surge, gas turbine engines have shown high radial interaction rates between the blade tips and abradable seals (approximately 40 inches/second) that can cause rapid depletion of the abrasive coating when rubbed against the abradable seals. Low radial interaction rates, which occur during certain engine operating conditions such as during low transient thermal or mechanical loading cycles (for example, during a green run), can also result in excessive wear and damage to abradable seals through the generation of a large thermal excursion within the seal system (abrasive tip and abradable seal). The layer of material disclosed herein reduces degradation of the abrasion coating and enhances abrasion resistance during operation of a turbomachinery.

Figure 1:
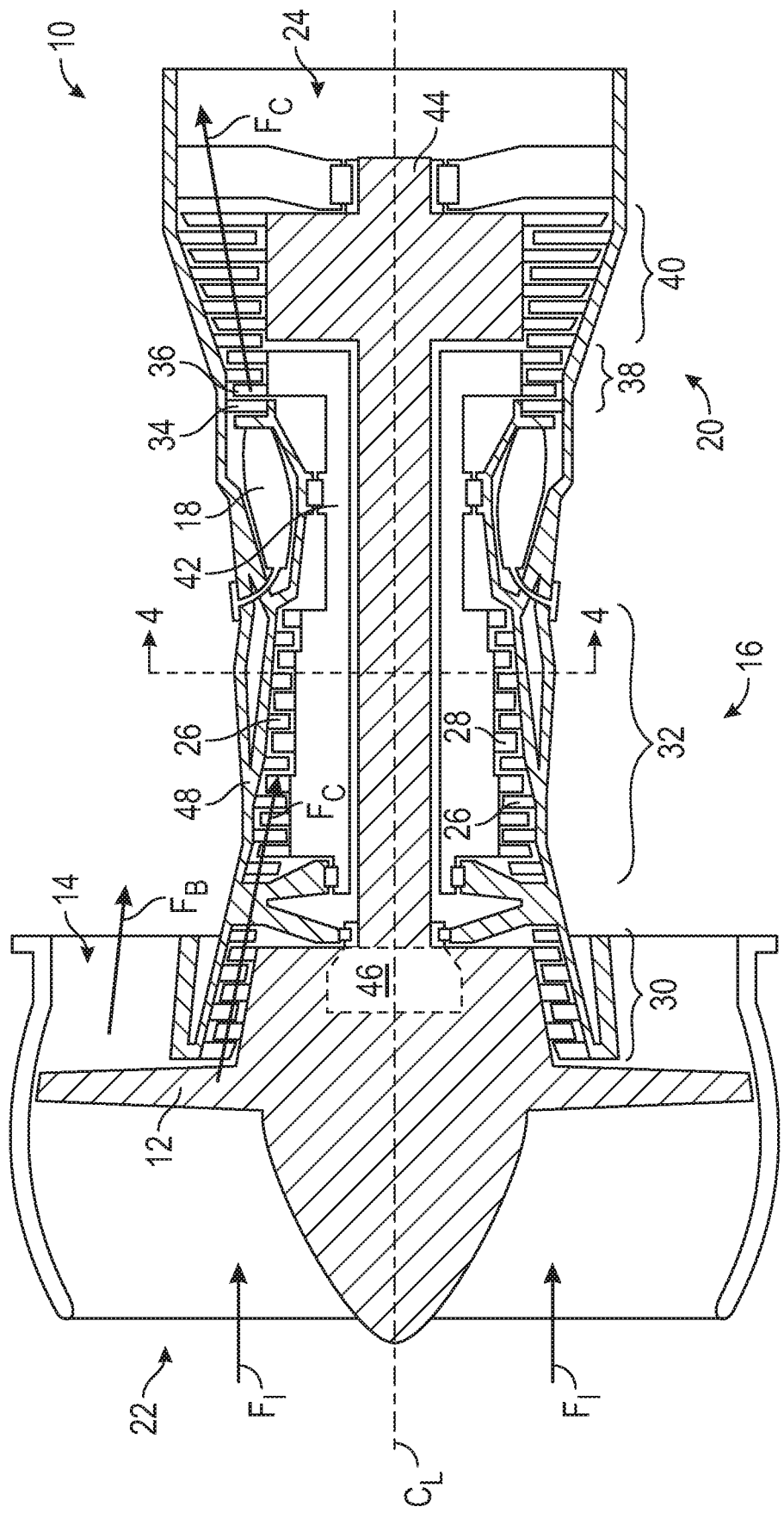
FIG. 1 is a cross-sectional view of gas turbine engine, in a turbofan embodiment.

FIG. 1 is a cross-sectional view of gas turbine engine 10, in a turbofan embodiment. As shown in FIG. 1, turbine engine 10 comprises fan 12 positioned in bypass duct 14, with bypass duct 14 oriented about a turbine core comprising a compressor (compressor section) 16, a combustor (or combustors) 18 and a turbine (turbine section) 20, arranged in a flow serially with the upstream inlet 22 and downstream exhaust 24.

Compressor 16 comprises stages of compressor vanes 26 and blades 28 arranged in low pressure compressor (LPC) section 30 and high pressure compressor (LPC) section 32. Turbine 20 comprises stages of turbine vanes 34 and turbine blades 36 arranged in high pressure turbine (HPT) section 38 and low pressure turbine (LPT) section 40. HPT section 38 is coupled to HPC section 32 via HPT shaft 42, forming the high pressure spool or high spool. LPT section 40 is coupled to LPC section 30 and fan 12 via LPT shaft 44, forming the low pressure spool or low spool. HPT shaft 42 and LPT shaft 44 are typically coaxially mounted, with the high and low spools independently rotating about turbine axis (centerline) $C_L$.

Fan 12 comprises a number of fan airfoils circumferentially arranged around a fan disk or other rotating member, which is coupled (directly or indirectly to LPC section 30 and driven by LPT shaft 44. In some embodiments, fan 12 is coupled to the fan spool via geared fan drive mechanism 46, providing independent fan speed control.

As shown in FIG. 1, fan 12 is forward-mounted and provides thrust by accelerating flow downstream through bypass duct 14, for example in a high-bypass configuration suitable for commercial and regional jet aircraft operations. Alternatively, fan 12 is an unducted fan or propeller assembly, in either a forward or aft-mounted configuration. In these various embodiments turbine engine 10 comprises any of a high-bypass turbofan, a low-bypass turbofan or a turboprop engine, and the number of spools and the shaft configurations may vary.

In operation of turbine engine 10, incoming airflow $F_I$ enters inlet 22 and divides into core flow $F_C$ and bypass flow $F_B$, downstream of fan 12. Core flow $F_C$ propagates along the core flowpath through compressor section 16, combustor 18 and turbine section 20, and bypass flow $F_B$ propagates along the bypass flowpath through bypass duct 14.

LPC section 30 and HPC section 32 of compressor 16 are utilized to compress incoming air for combustor 18, where fuel is introduced, mixed with air and ignited to produce hot combustion gas. Depending on embodiment, fan 12 also provides some degree of compression (or pre-compression) to core flow $F_C$, and LPC section 30 (or a portion of it) may be omitted. Alternatively, an additional intermediate spool is included, for example in a three-spool turboprop or turbofan configuration.

Combustion gas exits combustor 18 and enters HPT section 38 of turbine 20, encountering turbine vanes 34 and turbine blades 36. Turbine vanes 34 turn and accelerate the flow, and turbine blades 36 generate lift for conversion to rotational energy via HPT shaft 42, driving HPC section 32 of compressor 16 via HPT shaft 42. Partially expanded combustion gas transitions from HPT section 38 to LPT section 40, driving LPC section 30 and fan 12 via LPT shaft 44. Exhaust flow exits LPT section 40 and turbine engine 10 via exhaust nozzle 24.

The thermodynamic efficiency of turbine engine 10 is tied to the overall pressure ratio, as defined between the delivery pressure at inlet 22 and the compressed air pressure entering combustor 18 from compressor section 16. In general, a higher pressure ratio offers increased efficiency and improved performance, including greater specific thrust. High pressure ratios also result in increased peak gas path temperatures, higher core pressure and greater flow rates, increasing thermal and mechanical stress on engine components.

Figure 2A:
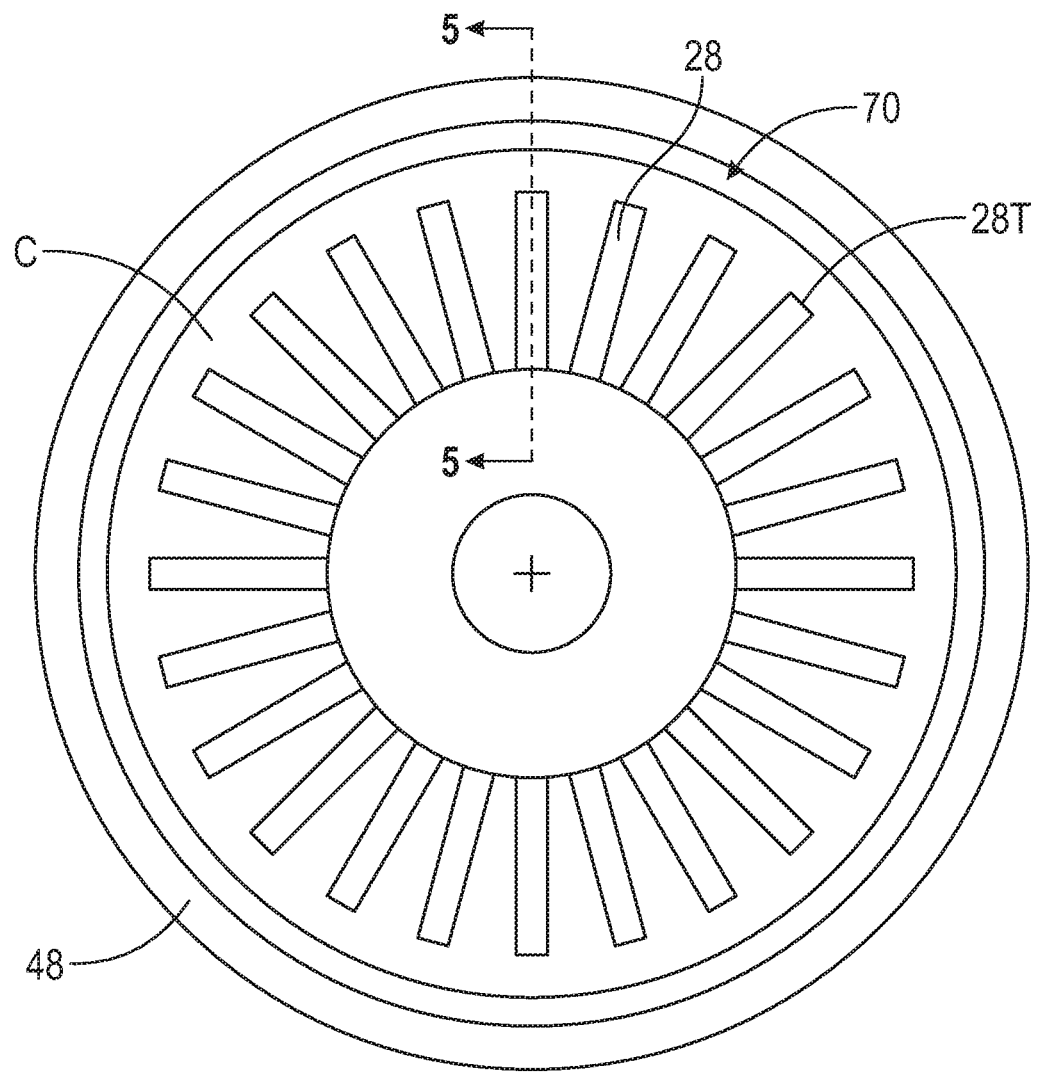
FIG. 2A is a partial cross-sectional view of an axial compressor of the gas turbine engine of FIG. 1.
Figure 2B:
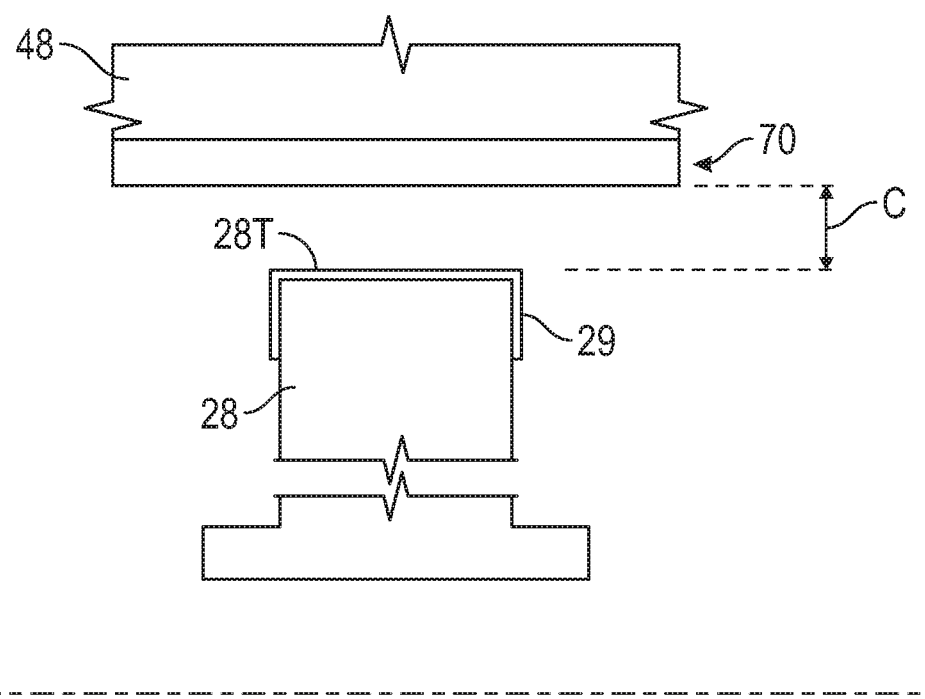
FIG. 2B is a cross-sectional view taken along the line 5-5 of FIG. 2A, not to scale.
Figure 3:
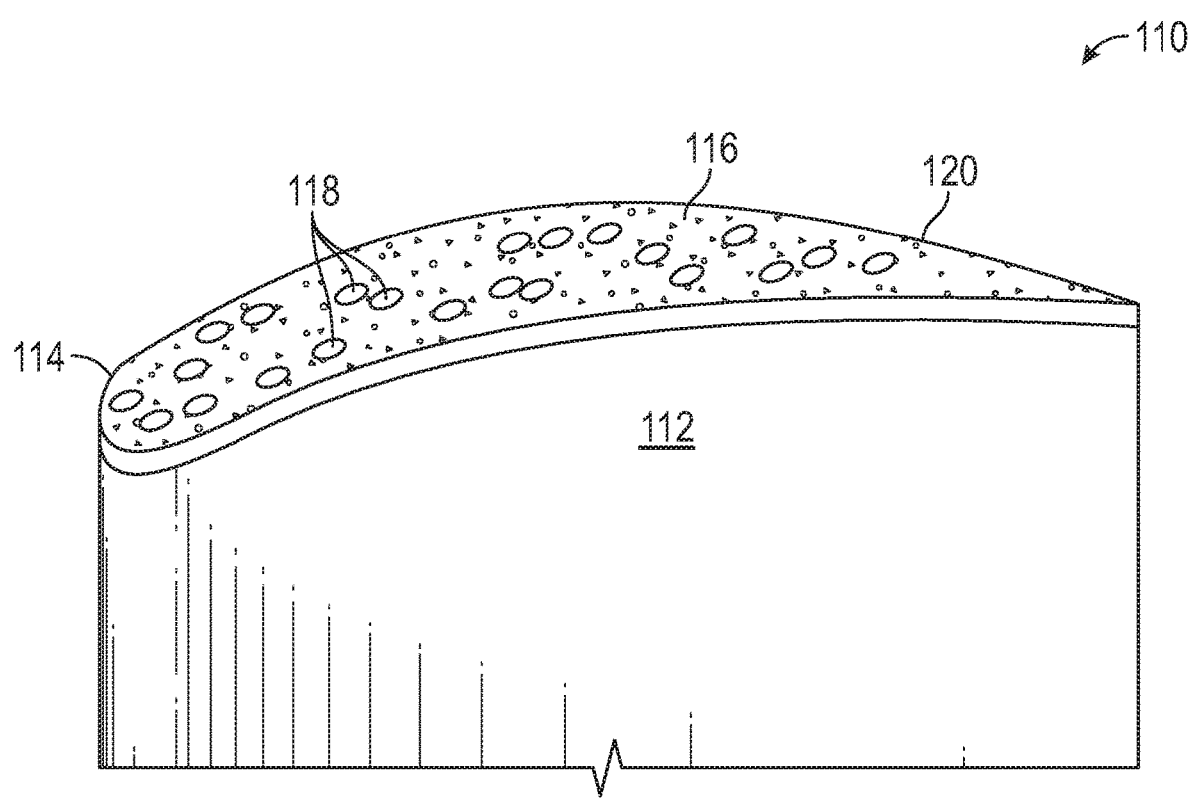
FIG. 3 is a schematic representation of an abrasive composite coating applied to a tip of a turbine engine component.

The present invention is intended to be used with airfoils in turbine engines. The term "airfoil" is intended to cover rotor blades. FIGS. 2A, 2B and FIG. 3 disclose the invention with respect to interaction of a rotor blade with a casing or shrouds. The coating of this invention may be used with either or both configurations.

As can be seen from FIG. 2A (which represents a cross-section view along line 4-4 of the FIG. 1) and FIG. 2B, the same concept is used in which coating 70 is provided on the inner diameter surface of casing or shroud 48 and thin film tip coating 29 (also referred to herein as a layer of material 29) is provided on tip 28T of blade 28. Coating 70 is an abradable coating (also termed an "abradable seal"). C in the FIGS. 2A and 2B represents the clearance between the coating 70 and the tip 28T. The layer of material 29 (described in detail below) comprises nitrides, alumino-nitrides, carbo-nitrides, oxides, or a combination thereof, is formed on the blade tip 28T of blade 28.

Any variety of rotor may be used, with one exemplary embodiment being an integrally-bladed rotor (IBR). IBRs are formed of a unitary or monolithic construction, wherein the radially projecting rotor blades are integrally formed with the central hub. Although the present disclosure will focus on an axial compressor rotor that is an IBR, it is to be understood that the presently described configuration could be equally applied to other types of rotor such as impellors (i.e. centrifugal compressors) which may or may not be IBRs, or to other rotors such as bladed rotors used in the compressor or turbine of a gas turbine engine.

Referring now to FIG. 3 there is illustrated a turbine engine component 110, such as a compressor blade. The blade 110 has an airfoil portion 112 with a tip 114. The tip 114 has an abrasive coating 116 applied to it. The abrasive coating 116 comprises a grit 118, such as cubic boron nitride (CBN), coated silicon carbide (SiC), alumina, zirconia, or a combination thereof dispersed in a matrix 120. The grit 118 may be a coarse grit. In an exemplary embodiment the grit 118 has an average particle size of 30 to 1000 micrometers, preferably 40 to 700 micrometers, and more preferably 50 to 600 micrometers. The average particle size refers to the average diameters of the particles as determined by methods such as dynamic light scattering, electrophoretic light scattering, static light scattering, laser diffraction, image analysis, or the like.

The grit 118 is homogeneously dispersed in the matrix 120 and covers 15 to 60 percent of the blade tip 114 surface area. In a preferred embodiment, the grit 118 is homogeneously dispersed in the matrix 120 and covers 35 to 53 percent of the blade tip 114 surface area.

The grit 118 is embedded in a matrix 120 of an electroplated alloy. The matrix 120 comprises a suitable oxidation-resistant material. In an exemplary embedment the matrix comprises nickel, cobalt, or MCrAlY, where M represents nickel, cobalt, aluminum, titanium, copper, chrome, or a combination thereof and can be electroplated or deposited by other means such as laser deposition. In an exemplary embodiment, the matrix 120 can comprise pure nickel.

Figure 4:
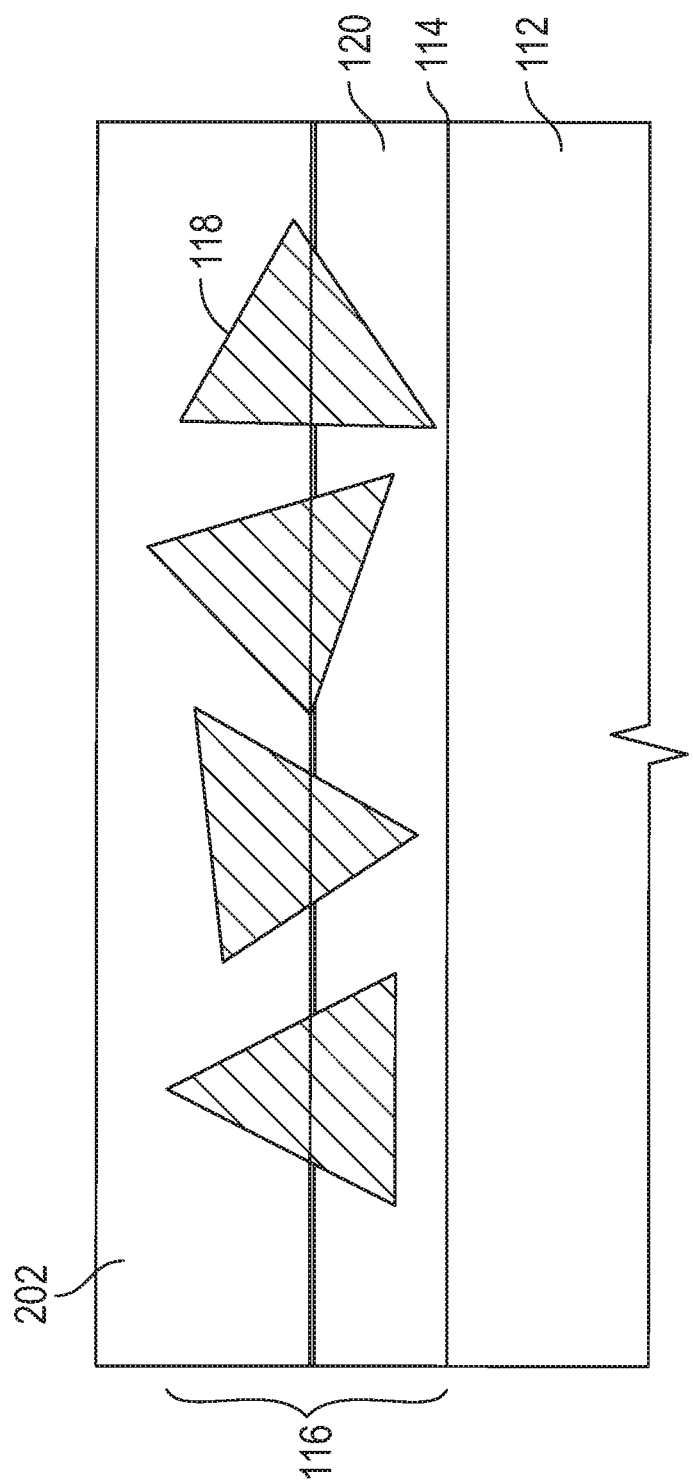
FIG. 4 is an exemplary schematic side view of an exemplary blade tip with an abrasive coating upon which is disposed the layer of material.

In one embodiment, a layer of material is disposed on the abrasive coating 116. FIG. 4 depicts a portion of the air foil 112 having a tip 114 that comprises an abrasive coating 116 where the grit 118 is dispersed in the matrix 120. A layer of material 202 is disposed upon the abrasive coating.

Figure 5:
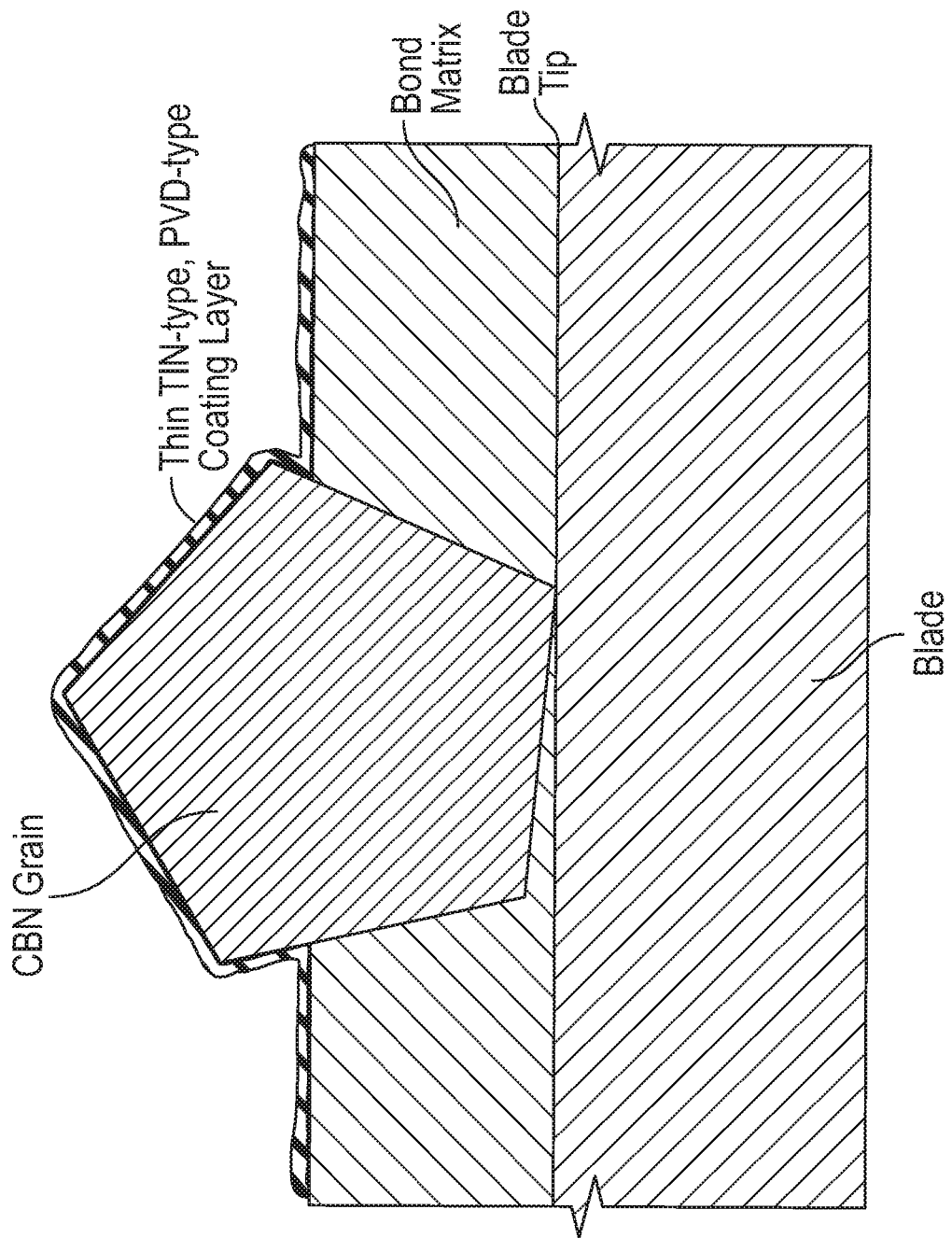
FIG. 5 is another exemplary schematic side view of an exemplary blade tip with an abrasive coating upon which is disposed the layer of material.

The layer of material 202 fully overlays the abrasive coating 116 along its upper (free) surface. The layer of material 202 overlays the matrix 120 and encapsulates the particles of grit 118. As can be seen in the FIG. 4, which is an exemplar side view of an airfoil, the layer of coating 202 directly contacts the matrix 120 along its free surface (the surface that would contact air if the layer 202 is absent) as well as the particles of grit 118 at their free surfaces. FIG. 5 is another exemplary schematic side view of an exemplary blade tip with an abrasive coating upon which is disposed the layer of material.

As noted above, the layer of material 202 partially or fully covers the matrix 120 as well as partially or fully covers the particles of grit 118 at their free surfaces. In a preferred embodiment, the layer of material 202 fully encapsulates all of the particles of grit 118 and fully covers the matrix 120. In other words, the layer of coating 202 fully covers the entire abrasive coating 116.

The layer of material 202 comprises nitrides, alumino-nitrides, carbo-nitrides, oxides, or a combination thereof. The nitrides include titanium nitride (TiN), boron nitride (BN), titanium-aluminum-nitrides [(TiAl)N], titanium-aluminum-silicon-nitrides [(TiAlSi)N], chromium nitrides (CrN), or a combination thereof. The oxides include aluminum oxides ($Al_2O_3$), titanium oxides ($TiO_2$), or a combination thereof. The carbon nitrides include silicon carbonitride (SiCN), titanium carbo-nitride (TiCN), or a combination thereof. In a preferred embodiment, the layer of material 202 includes titanium nitride, titanium alumininum-nitride, or a combination thereof. The layer of 202 can be a single layer or a multilayer coating such as TiN/TiAlN/TiCN or any combination of the single layer coatings listed above.

The layer of material may be amorphous or crystalline. These types of coatings are very often used for rotary tooling. The layer of material 202 has a thickness of 0.1 to 50 micrometers, preferably 0.5 to 30 micrometers, and more preferably 1 to 25 micrometers.

In one embodiment, in one method of manufacturing an airfoil that comprises a tip that contains the layer of material, the tip is first coated with the abrasive coating 116 that contains grit 118 dispersed in a matrix 120. During this process, the portions of the airfoil other than the tip are masked to prevent accidental deposition of the matrix or the grit. The matrix may be deposited using electrolytic deposition, vapor deposition, dip coating, spray painting, laser deposition or a combination thereof. The grit may then be pressed into the matrix after its deposition on the tip or during the deposition on the tip.

Following the formation of the abrasive coating 116, the layer of material is disposed on the abrasive coating 116 via physical vapor deposition (PVD), chemical vapor deposition (CVD), plasma enhanced chemical vapor deposition (PECVD), metal organic chemical vapor deposition (MOCVD), arc ion plating, cathodic arc evaporation, or a combination thereof. Physical vapor deposition is preferred.

In one embodiment, the tip with the abrasive coating 116 disposed thereon is placed in a physical vapor deposition chamber in order to form the layer of material thereon. Portions of the rotor may be masked to prevent the unwanted deposition of the material on certain parts of the rotor.

The chamber may be subjected to a vacuum if desired. A precursor is heated above it evaporation point and is allowed to deposit on the abrasive coating 116. The volatile precursors react and/or decompose on the substrate surface to produce the desired layer of material. Examples of suitable precursors are titanium, aluminum, silicon, chromium, or combination of thereof.

In an exemplary embodiment, to deposit a layer of material that comprises TiN or TiAlN, the targets used are pure titanium (99.9% mole fraction Ti) and pure aluminum (99.9% mole fraction Al). Titanium and aluminum plasmas are respectively generated from these pure targets. In a titanium aluminum alloy, the atomic ratio of Al to Ti is preferably 50:50. In an embodiment, TiN/TiAlN multilayers may be disposed on the tip of the rotor with an average periodicity of 0.1 to 5 micrometers.

In order to produce titanium nitride or titanium aluminum nitride, a reactive atmosphere containing nitrogen is used in the chamber during the deposition of titanium or of titanium aluminum on the substrate (e.g., the rotor tip). The substrate may be maintained at an elevated temperature of 650° C. or less, preferably 480° C. or less, during the formation of the TiN or the TiAlN. In an embodiment, in order to improve adhesion between the abrasion layer 116 and the layer of material, a titanium layer may be disposed on the abrasion layer 116.

This method is advantageous because the thin hard coating is expected to prevent grain pullout from the matrix. Without being limited to theory, it is believed that the high energy ion impingement of TiN within the electroplated matrix such as nickel coupled with the strong affinity of nickel towards titanium prevents the grains of grit from being extracted from the matrix. Under such conditions, a cross-diffusion occurs with the formation of very hard nickel-titanium intermetallic phases up to a certain depth between TiN and a nickel matrix. The TiN may also penetrate the surface of the cBN grit to bind with the molecules of the substrate, thereby creating a direct bond between the exterior TiN coating and the interior substrate.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. An article comprising:
    a substrate;
    an abrasive coating disposed on the substrate; where the abrasive coating comprises a matrix having abrasive grit particles dispersed therein; and
    a layer of material disposed on the abrasive coating; where the layer of material covers an entire surface of the abrasive coating; where the layer of material has a thickness of 0.1 to 50 micrometers measured from an interface between the abrasive coating and the layer of material; and where the layer of material is a boron nitride (BN), titanium-aluminum-nitrides [(TiAl)N], titanium-aluminum-silicon-nitrides [(TiAlSi)N], chromium nitrides (CrN), titanium oxide (TiO$_2$), silicon carbo-nitride (SiCN), titanium carbo-nitride (TiCN), or a combination thereof.

2. The article of claim 1, where the substrate comprises a tip of an airfoil.

3. The article of claim 1, where the abrasive grit particles comprise cubic boron nitride (CBN), coated silicon carbide (SiC), alumina, zirconia, or a combination thereof.

4. The article of claim 1, where the matrix is nickel, cobalt, or MCrAlY, where M represents nickel, cobalt, aluminum, titanium, copper, chrome, or a combination thereof.

5. The article of claim 1, where the abrasive grit particles are homogeneously dispersed and cover 15 to 60 percent of the blade tip surface area.

6. The article of claim 1, where the abrasive grit particles have an average particle size of 30 to 1000 micrometers.

* * * * *